UNITED STATES PATENT OFFICE.

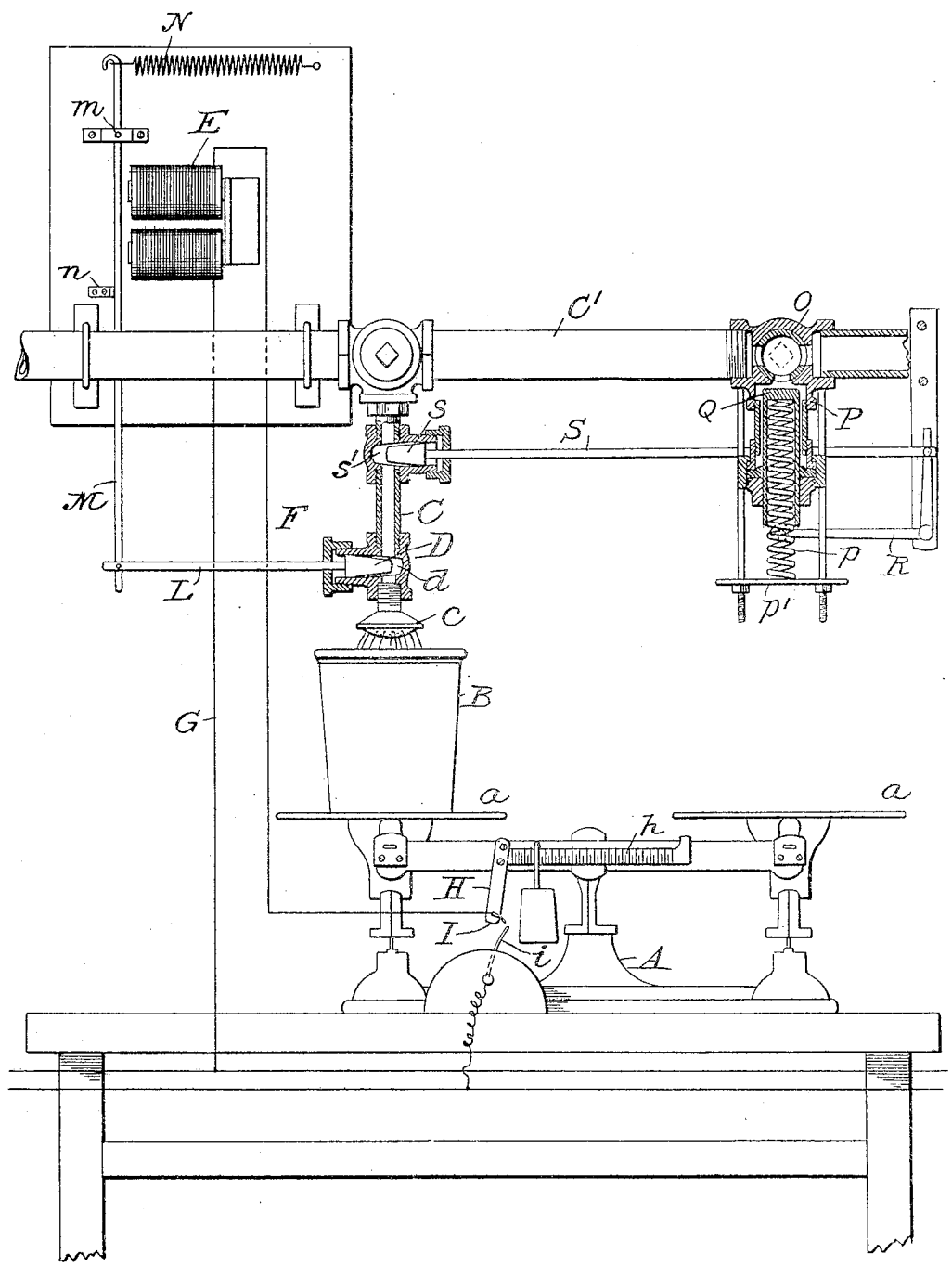

CHARLES EDWARD SNYPP, OF GRETNA, LOUISIANA, ASSIGNOR TO THE SOUTHERN COTTON OIL COMPANY, OF JERSEY CITY, NEW JERSEY, A CORPORATION OF NEW JERSEY.

ELECTRIC SCALE FOR ACCURATE LARD-WEIGHING.

No. 809,026.            Specification of Letters Patent.            Patented Jan. 2, 1906.

Application filed June 25, 1903. Serial No. 163,066.

*To all whom it may concern:*

Be it known that I, CHARLES EDWARD SNYPP, a citizen of the United States of America, and a resident of Gretna, in the parish of Jefferson and State of Louisiana, have invented certain new and useful Improvements in Electric Scales for Accurate Lard-Weighing, of which the following is a specification.

My invention relates to certain new and useful improvements in electric scales and weighing devices for the gaging and weighing of specific quantities of lard and other similar substances, such as can be directed into packages by gravity or under pressure, the object of the invention being to insure accuracy in weighing; and it consists, essentially, in an automatic instantaneous cut-off mechanism whereby the substance flowing into the cans or other packages can be instantly cut off when the requisite amount has been drawn from the source of supply, and, also, it consists in numerous details and peculiarities in the construction and combination, including a pressure-controlling device, substantially as hereinafter described and claimed.

The annexed drawing has a single figure, which illustrates my improved electric scale for accurate lard-weighing in side elevation.

A denotes any ordinary or well-known scale—as, for instance, a common trip-balance grocery-scale—the same having the platforms *a a*. This scale, however, is given simply by way of illustration.

B represents a lard bucket or package adapted to be placed on the scale-platform *a* to receive the lard or other substance to be weighed as drawn from the source of supply by a pipe or conduit C', having a branch C, provided with a delivery-nozzle *c*, which delivers into the bucket or package B. Heretofore it has been the common practice in lard-weighing to conduct or regulate the passage of the lard in pipe C by means of a hand-valve adapted to be turned on or shut off at the will of the operator accordingly as the scale might indicate. With my present improvements, however, this work is done automatically, so that accuracy in the result is promoted and assured.

E designates an electromagnet operating by induction. In the pipe C is a valve D, working in conjunction with a valve-seat *d*, the valve and seat being a short distance from the delivery-nozzle *c*. Valve D is provided with a rod L, pivoted to a lever M, whose fulcrum is at *m*. A spring N is attached to the free end of lever M and also to a fixed point and operates to draw the lever M away from the electromagnet E. When so drawn away, lever M abuts against the fixed stop *n*. Obviously when the electromagnet E is energized and the lever M is drawn against it the valve D, through the movement of the valve-rod L, will be closed.

F denotes a wire leading from electromagnet E to an arm H on the scale-beam *h*, said arm H having a contact-finger I. Another wire G leads from the electromagnet E to the contact-finger *i*. The two fingers I and *i* are adapted to come into contact with each other when the scale tips. The current is automatically turned on by the slightest movement of the scale. When the bucket or package B has received its specific quantity, the scale moves, makes contact between the fingers I and *i*, closes thereby the current and causes the electromagnet E to act on the lever M, whereby the valve D is instantaneously closed and the supply of lard or other substance cut off. Obviously by the proper adjustment of the scale-weights this cut-off may be made to take place when any desired quantity of lard has been deposited in the package. As soon as the filled package is removed from the scale-platform the spring N will restore the lever M to its normal position, which will cause the valve D to be opened for the purpose of enabling a new package to be filled.

It becomes necessary in feeding lard to a weighing device to control the pressure in the supply-pipe wherever there is a variation in the pressure of the lard or material to be weighed. Hence I provide a pressure-controlling device consisting of a valve O in the supply-pipe C', adjacent to which valve O is a casing P, containing a plunger Q, acted on by a spring *p*, tensioned against a rigid frame P'. To this spring *p* is connected a bell-crank lever R, which is pivotally attached to a valve-rod S, carrying a valve *s*, which works in conjunction with a seat *s'*, arranged in the pipe C. This pressure device therefore automatically controls the amount of lard discharged into the package B by controlling the pressure at the delivery-orifice and makes the amount of lard discharged constant regardless of the pressure above the delivery-orifice.

The plunger Q reciprocates under the pressure of the lard and when the pressure diminishes is restored to its position by the special spring $p$. When the pressure in the feed-pipe C' becomes excessive and the velocity and force of delivery of the lard in the package becomes greater, the plunger Q will act in consequence of the lard pressing on the area of its end, thereby compressing spring $p$ and through the lever R and rod S closing the valve $s$, so as to cut off a portion of the lard, diminish the quantity passing, and thus keep the flow constant.

Having thus described my invention, what I claim as new, and desire to secure by Letters Patent, is—

1. In a device for weighing lard and automatically cutting off the flow thereto, the combination with a scale, of a feed-pipe, a valve in said pipe having a valve-rod, a pivoted lever connected to said rod, a spring attached to the end of the lever and acting to open the valve, an electromagnet arranged in connection with said lever and operating to close the valve, and an electric circuit having contacts, one of which is on the scale, so that the circuit may be closed to close the valve when the required delivery of lard or similar material has passed said valve, the movement of the scale thus controlling the magnet.

2. The combination with a scale, of a feed-pipe for delivering lard or similar substance to a receptacle on the scale, a valve in said pipe controlled by an electric circuit which is itself controlled by the movements of the scale, and a pressure-valve likewise in the feed-pipe, together with a pressure-controlling mechanism consisting essentially of a spring-plunger acted on by the pressure in the supply-pipe and opening and closing the aforesaid valve so as to make the quantity of the flow constant.

Signed at Gretna, Louisiana, this 20th day of June, 1903.

CHARLES EDWARD SNYPP.

Witnesses:
DAVID SCHWARTZ,
DAVID F. BROWN.